(12) United States Patent
Ma et al.

(10) Patent No.: US 7,690,031 B2
(45) Date of Patent: *Mar. 30, 2010

(54) MANAGING BAD BLOCKS IN FLASH MEMORY FOR ELECTRONIC DATA FLASH CARD

(75) Inventors: Abraham C. Ma, Fremont, CA (US);
Charles C. Lee, Cupertino, CA (US);
I-Kang Yu, Palo Alto, CA (US);
Edward W. Lee, Mountain View, CA (US); Ming-Shiang Shen, Taipei Hsien (TW)

(73) Assignee: Super Talent Electronics, Inc., San Jose, CA (US)

(*) Notice: Subject to any disclaimer, the term of this patent is extended or adjusted under 35 U.S.C. 154(b) by 773 days.

This patent is subject to a terminal disclaimer.

(21) Appl. No.: 11/471,000

(22) Filed: Sep. 7, 2006

(65) Prior Publication Data

US 2007/0283428 A1 Dec. 6, 2007

Related U.S. Application Data

(63) Continuation-in-part of application No. 09/478,720, filed on Jan. 6, 2000, now Pat. No. 7,257,714, and a continuation-in-part of application No. 10/799,039, filed on Mar. 11, 2004, now abandoned, and a continuation-in-part of application No. 11/458,987, filed on Jul. 20, 2006.

(51) Int. Cl.
*G06F 7/04* (2006.01)

(52) U.S. Cl. .......................................... 726/9; 713/172

(58) Field of Classification Search ................ 713/167, 713/185, 186, 189, 193; 380/115, 116, 217; 726/9, 20; 711/100, 115, 170

See application file for complete search history.

(56) References Cited

U.S. PATENT DOCUMENTS

| 5,404,485 | A | 4/1995 | Ban |
| 5,623,552 | A | 4/1997 | Lane |
| 5,907,856 | A | 5/1999 | Estakhri et al. |
| 5,936,884 | A | 8/1999 | Hasbun et al. |
| 5,959,541 | A | 9/1999 | DiMaria et al. |
| 6,000,006 | A | 12/1999 | Bruce et al. |
| 6,012,636 | A * | 1/2000 | Smith ........................ 235/380 |
| 6,069,920 | A | 5/2000 | Schulz et al. |

(Continued)

*Primary Examiner*—Beemnet W Dada
(74) *Attorney, Agent, or Firm*—Bever, Hoffman & Harms, LLP; Patrick T. Bever

(57) ABSTRACT

An electronic data flash card accessible by a host computer, includes a flash memory controller connected to a flash memory device, and an input-output interface circuit activated to establish a communication with the host. In an embodiment, the flash card uses a USB interface circuit for communication with the host. A flash memory controller includes an arbitrator for mapping logical addresses with physical block addresses, and for performing block management operations including: storing reassigned data to available blocks, relocating valid data in obsolete blocks to said available blocks and reassigning logical block addresses to physical block addresses of said available blocks, finding bad blocks of the flash memory device and replacing with reserve blocks, erasing obsolete blocks for recycling after relocating valid data to available blocks, and erase count wear leveling of blocks, etc. Furthermore, each flash memory device includes an internal buffer for accelerating the block management operations.

12 Claims, 10 Drawing Sheets

U.S. PATENT DOCUMENTS

| | | |
|---|---|---|
| 6,081,858 A | 6/2000 | Abudayyeh et al. |
| 6,125,192 A * | 9/2000 | Bjorn et al. ................. 382/124 |
| 6,145,069 A | 11/2000 | Dye |
| 6,148,354 A | 11/2000 | Ban et al. |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,275,894 B1 | 8/2001 | Kuo et al. |
| 6,321,478 B1 | 11/2001 | Klebes |
| 6,718,407 B2 | 4/2004 | Martwick |
| 6,886,104 B1 * | 4/2005 | McClurg et al. ............ 713/300 |
| 7,069,370 B2 | 6/2006 | Sukegawa et al. |
| 7,257,714 B1 * | 8/2007 | Shen ......................... 713/186 |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2003/0177300 A1 | 9/2003 | Lee et al. |
| 2003/0182528 A1 | 9/2003 | Ajiro |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |

* cited by examiner

MANAGING BAD BLOCKS IN FLASH MEMORY FOR ELECTRONIC DATA FLASH CARD

RELATED APPLICATIONS

This application is a continuation-in-part of U.S. patent application for "ELECTRONIC DATA STORAGE MEDIUM WITH FINGERPRINT VERIFICATION CAPABILITY", U.S. application Ser. No. 09/478,720, filed Jan. 6, 2000, a continuation-in-part of U.S. patent application for "ELECTRONIC DATA FLASH CARD WITH FINGERPRINT VERIFICATION CAPABILITY", U.S. application Ser. No. 11/458,987, filed Jul. 20, 2006, and a continuation-in-part of U.S. patent application for "SYSTEM AND METHOD FOR MANAGING BLOCKS IN FLASH MEMORY", U.S. application Ser. No. 10/799,039, filed Mar. 11, 2004.

FIELD OF THE INVENTION

The invention relates to electronic data flash cards, more particularly to a system and method for managing blocks of memory in the flash memory devices of an electronic data flash card.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information.

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with mobile systems and low-power feature.

However, there are inherent limitations associated with flash memory. First, flash memory cells that have already been programmed must be erased before being reprogrammed. Also, flash memory cells have a limited life span; i.e., they can be erased only a limited number of times before failure. For example, one million is a typical maximum number of erases for a NAND flash memory cell. Accordingly, flash memory access is slow due to the erase-before-write nature, and ongoing erasing will damage the flash memory cells over time.

The memory cell array of a flash memory device is typically organized into basic structures referred to as "sectors" or "pages", which in turn are grouped into "blocks". A sector can have 512 bytes (small block format), or 2048 bytes (large block format) as a data field, and 16 bytes or 64 bytes as a spare field. A block is a group (e.g., 16, 32, 64, or more) of sectors, with the number of sectors depending on the specific application. A block is considered "bad" if any of its sectors contains one or more non-functional memory cells (i.e., one or more memory cells that fail to achieve a predetermined minimal operating state during a program or erase operation). A block is considered "good" if all of its memory cells are functional.

A flash memory device may initially have a large number (e.g., 10%) of bad blocks. In addition, a flash memory device may have initially good blocks that later become bad blocks before the end of the manufacturer-specified life span of the flash memory device. These bad blocks manifest during write or erase operations of flash memory device. Unfortunately, increasing occurrences of bad blocks dramatically decreases the performance of the flash memory system.

Most flash memory systems (e.g., electronic data flash cards) utilize more than one flash memory device, and deal with bad blocks by searching the arrays of multiple flash memory devices for available good blocks. Valid data that is stored in a bad block (or data assigned to a bad block) needs to be reassigned and/or relocated to one or more available good blocks. According to conventional methods, this reassignment/relocation process typically involves transferring the data to an external buffer (i.e., located off of the flash memory device) while available good blocks with available good sectors are searched for in any of the flash memory devices of the system. The data is then written to those blocks when a sufficient number of available good sectors are found.

A problem with the above-described conventional reassignment/relocation process is that if one or more flash memory devices are at capacity (i.e., no available good blocks), the flash memory system must continue searching other flash memory devices until a sufficient number of available good blocks with available good sectors are found. This can cause congestion at the external buffer, which adversely affects the overall performance of the flash memory system.

The number of available good blocks in a flash memory device become fewer as flash memory devices fill to capacity and as the number of obsolete (non-valid) blocks increases. An obsolete block is a good block with obsolete sectors, which are sectors that have been programmed with data but the data has been subsequently updated. When the data is updated, the obsolete data remains in the obsolete sector and the updated data is written to new sectors, which become valid sectors having valid data. Valid data can include updated data as well as data that has not been updated. Accordingly, the number of obsolete blocks grows as files are modified or deleted.

Obsolete blocks are recycled in an operation commonly referred to as a "garbage collection" operation. During a garbage collection operation, obsolete blocks are erased so that they are again available for future write operations. An obsolete block can contain both obsolete data and valid data. The valid data needs to be copied to an available good block before the obsolete block can be erased. During a garbage collection operation while a search for available good blocks is being conducted, valid data in an obsolete block is copied to an external buffer while multiple flash memory devices are globally searched to locate available good blocks. Once found, the valid data in the external buffer can be copied to the available good blocks. Similar to the reassignment/relocation process, a problem with this conventional garbage collection operation is that congestion can occur at the external buffer, which adversely affects the performance of the flash memory system.

Another solution for dealing with bad blocks involves replacing blocks in an operation commonly referred to as "wear leveling." In such an operation, valid data is transferred from one block to another to distribute the data more evenly. However, this operation also involves an external buffer and a search for available good blocks among multiple devices. As stated above, such operations can result in congestion at the external buffer, which adversely affects performance of the flash memory system.

Generally, there is not a good solution to these problems today in that conventional approaches do not address the added processing time required to search multiple flash memory devices for available good blocks. The known solutions also do not address the issue of potential congestion at the external buffer that can occur during such a search. Unfortunately, such limitations adversely affect the management of bad blocks, garbage collection, and wear leveling.

Accordingly, what is needed is an improved system and method for controlling flash memory. The system and method should address the processing time required to search for available good blocks when dealing with bad blocks, garbage collection, and wear leveling. The system and method should also be simple, cost effective and capable of being easily adapted to existing technology. The present invention addresses such a need.

SUMMARY OF THE INVENTION

The present invention is generally directed to an electronic data flash card including a flash memory device, a fingerprint sensor, an input-output interface circuit and a processing unit. The electronic data flash card is adapted to be accessed by a host (external) computer such as a personal computer, notebook computer or other electronic host device. As an electronic data flash card is easier to carry and durable for ruggedness, personal data can be stored inside the flash memory device in an encrypted form such that it can only be accessed, for example, by way of a fingerprint sensor associated with card body to make sure unauthorized person cannot misuse the card.

In accordance with an aspect of the invention, a flash memory controller is part of the processing unit to control the operation of the flash memory device. The processing unit is connected to the flash memory device and the input/output interface circuit. The flash memory controller logic includes a flash type algorithm for detecting whether the flash memory device is of a flash type that is supported by the flash memory controller logic. By storing the dynamic portion of the flash detection algorithm code along with the confidential data in at least one flash memory device, not only can the ROM size of the electronic data flash card be reduced, but new flash types can be supported without hardware alteration simply by changing the dynamic portion of the flash type detection algorithm codes stored in the flash memory. The overall cost is reduced and the unnecessary development time is also eliminated.

In accordance with another embodiment of the present invention, the processing unit of an electronic data flash card is operable selectively in a programming mode, a data retrieving mode, and a resetting mode. When the processing unit is in the programming mode, the processing unit activates the input/output interface circuit to receive the confidential data file from the host computer, and to store the data file in the flash memory device. When the processing unit is in the data retrieving mode, the processing unit activates the input/output interface circuit to transmit the data file to the host computer. In the data resetting mode, the data file (and the reference fingerprint data) is/are erased from the flash memory device.

In one embodiment, the processing unit is a microprocessor including one of an 8051, 8052, 80286, RISC, ARM, MIPS or digital signal processor (DSP).

In accordance with an embodiment of the present invention, the input/output (I/O) interface circuit is a USB interface circuit.

In accordance with another embodiment of the present invention, a USB flash device transfers high-speed data to and from host computer using only the Bulk-Only Transfer (BOT) protocol. BOT is a more efficient and faster transfer protocol than CBI protocol because BOT transport of command, data, status rely on Bulk endpoints in addition to default Control endpoints.

In accordance with another embodiment of the present invention, an electronic data flash card (or other flash memory system) includes a flash memory controller having a processor that performs block management operations on multiple flash memory devices associated with the system. These block management operations include identifying bad blocks, recycling obsolete blocks, and wear leveling operations. In one aspect of the present invention, the processor utilizes data from arbitration logic to direct a search for available good blocks on a particular flash memory device during block management operations, instead of directing the search to all of the flash memory devices as in the prior art. In addition, the processor utilizes an internal buffer within each flash memory device to store valid data during the search for available good blocks on that flash memory device. By limiting the search for available good blocks to a specific flash memory device, and by utilizing an internal buffer provided on the specified flash memory device, the present invention reduces the search time for available good blocks and eliminates the need for an external buffer, thereby avoiding the external buffer congestion that adversely affects performance of conventional flash memory systems. Consequently, the speed at which block management operations are performed is significantly increased.

BRIEF DESCRIPTION OF THE DRAWING

Other features and advantages of the present invention will become apparent in the following detailed description of the preferred embodiment with reference to the accompanying drawings, of which.

DETAILED DESCRIPTION

Figure 1:
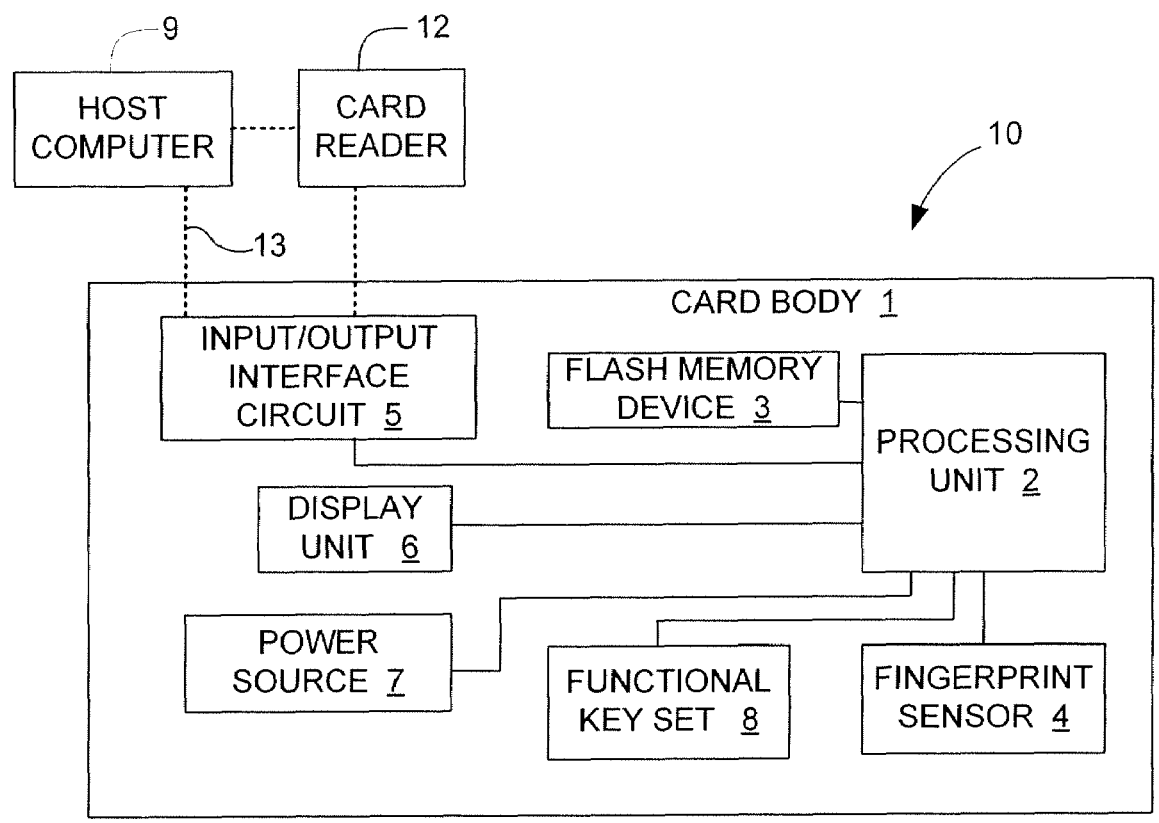
FIG. 1 is a block diagram showing an electronic data flash card with fingerprint verification capability in accordance with an embodiment of the present invention.

Referring to FIG. 1, according to an embodiment of the present invention, an electronic data flash card 10 is adapted to be accessed by an external (host) computer 9 either via an interface bus 13 or a card reader 12 or other interface mechanism (not shown), and includes a card body 1, a processing unit 2, one or more flash memory devices 3, a fingerprint sensor 4, an input/output interface circuit 5, an optional display unit 6, an optional power source (e.g., battery) 7, and an optional function key set 8.

Flash memory device 3 is mounted on the card body 1, stores in a known manner therein one or more data files, a reference password, and the reference fingerprint data obtained by scanning a fingerprint of one or more authorized users of the electronic data flash card 10. Only authorized users can access the stored data files. The data file can be a picture file or a text file.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish communication with the host computer 9 by way of an appropriate socket via an interface bus 13 or a card reader 12. In one embodiment, input/output interface circuit 5 includes circuits and control logic associated with a Universal Serial Bus (USB), PCMCIA or RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader 12.

The processing unit 2 is mounted on the card body 1, and is connected to the flash memory device 3, the fingerprint sensor 4 and the input/output interface circuit 5 by way of associated conductive traces or wires disposed on card body 1. In one embodiment, processing unit 2 is one of an 8051, 8052, 80286 microprocessors available, for example, from Intel Corporation. In other embodiments, processing unit 2 includes a RISC, ARM, MIPS or other digital signal processors (DSP). In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file and the reference fingerprint data from the host computer 9, and to store the data file and the reference fingerprint data in flash memory device 3; (2) a data retrieving mode, where the processing unit 2 activates the input/output interface circuit 5 to transmit the data file stored in flash memory device 3 to the host computer 9; and (3) a data resetting mode, where the data file and the reference fingerprint data are erased from the flash memory device 3. In operation, host computer 9 sends write and read requests to electronic data flash card 10 via interface bus 13 or a card reader 12 and input/output interface circuit 5 to the processing unit 2, which in turn utilizes a flash memory controller (not shown) to read from or write to the associated one or more flash memory devices 3. In one embodiment, for further security protection, the processing unit 2 automatically initiates operation in the data resetting mode upon detecting that a preset time period has elapsed since the last authorized access of the data file stored in the flash memory device 3.

The optional power source 7 is mounted on the card body 1, and is connected to the processing unit 2 and other associated units on card body 1 for supplying electrical power thereto.

The optional function key set 8, which is mounted on the card body 1, is connected to the processing unit 2, and is operable so as to initiate operation of processing unit 2 in a selected one of the programming, data retrieving and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Additional features and advantages of the present invention are set forth below.

Figure 2:
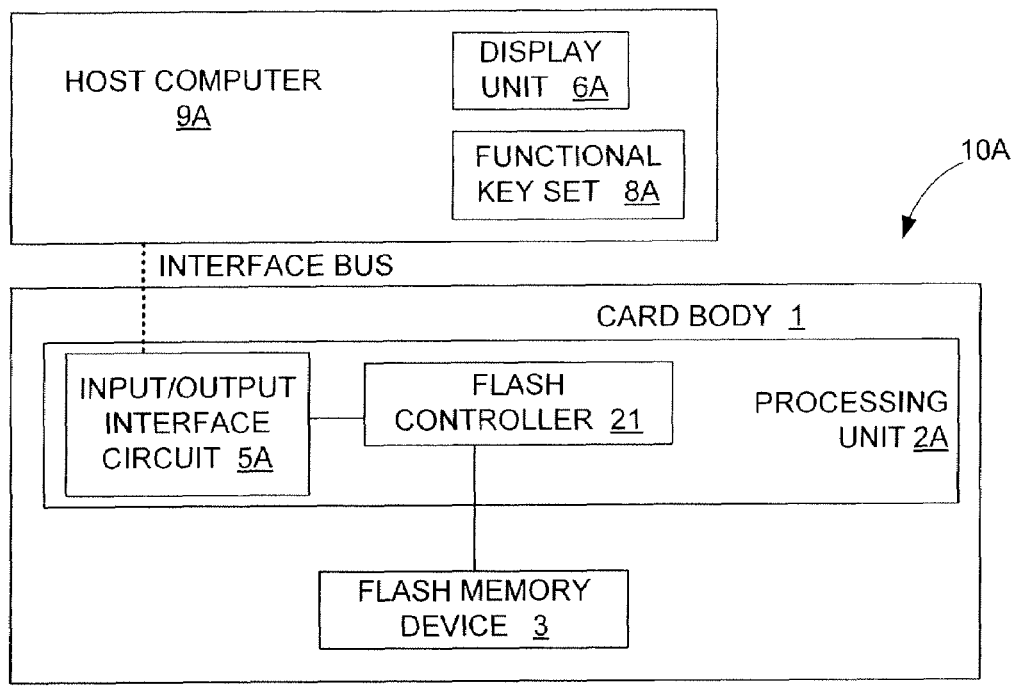
FIG. 2 is a schematic circuit block diagram illustrating an electronic data flash card according to another embodiment of the present invention.

FIG. 2 is a block diagram of an electronic data flash card 10A in accordance with an alternative embodiment of the present invention that omits the fingerprint sensor and the associated user identification process. The electronic data flash card 10A includes a highly integrated processing unit 2A including an input/output interface circuit 5A and a flash memory controller 21 for integration cost reduction reasons. Input/output interface circuit 5A includes a transceiver block, a serial interface engine block, data buffers, registers and interrupt logic. Input/output interface circuit 5A is coupled to an internal bus to allow for the various elements of input/output interface circuit 5A to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 3.

In this embodiment, host computer 9A includes a function key set 8A, is connected to the processing unit 2A via an interface bus or a card reader when electronic data flash card 10A is in operation. Function key set 8A is used to selectively set electronic data flash card 10A in one of the programming, data retrieving and data resetting modes. The function key set 8A is also operable to provide an input password to the host computer 9A. The processing unit 2A compares the input password with the reference password stored in the flash memory device 3, and initiates authorized operation of electronic data flash card 10A upon verifying that the input password corresponds with the reference password.

Also in this embodiment, a host computer 9A includes display unit 6A, is connected to the processing unit 2A when electronic data flash card 10A is in operation via an interface bus or a card reader. Display unit 6A is used for showing the data file exchanged with the host computer 9A, and for showing the operating status of the electronic data flash card 10A.

Figure 3:
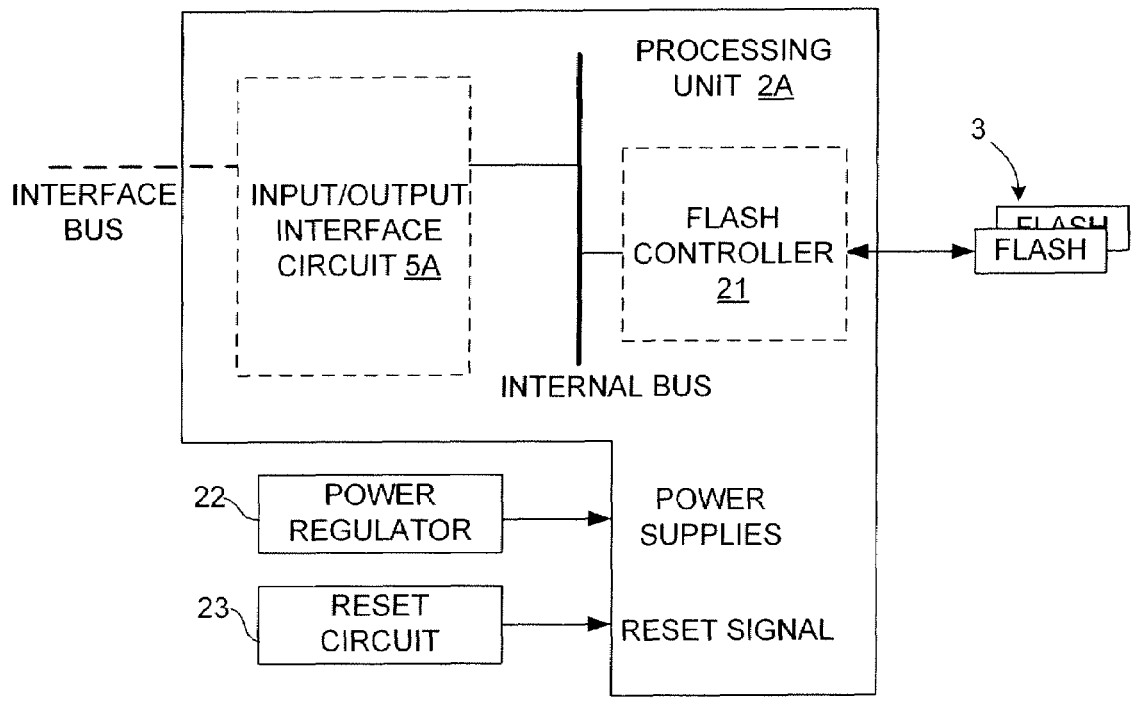
FIG. 3 is a block diagram of a processing unit utilized in an electronic data flash card in accordance with another embodiment of the present invention.

FIG. 3 shows processing unit 2A in additional detail. Electronic data flash card 10A includes a power regulator 22 for providing one or more power supplies to processing unit 2A. The power supplies provide different voltages to associated units of electronic data flash card 10A according to the power requirements. Capacitors (not shown) may be required for power stability. Electronic data flash card 10A includes a reset circuit 23 for providing a reset signal to processing unit 2A. Upon power up, reset circuit 23 asserts reset signal to all units. After internal voltages reach a stable level, the reset signal is then de-asserted, and resisters and capacitors (not shown) are provided for adequate reset timing adjustment. Electronic data flash card 10A also includes a quartz crystal oscillator (not shown) to provide the fundamental frequency to a PLL within processing unit 2A.

In accordance with an embodiment of the invention, input/output interface circuit 5A, reset circuit 23, and power regulator 22 are integrated or partially integrated within processing unit 2A. The high integration substantially reduces the overall space needed, the complexity, and the cost of manufacturing.

Compactness and cost are key factors to removable devices such as the electronic data flash cards described herein. Modern IC packaging can integrate discrete IC components with different technology and material into one IC package. For example, the input/output interface circuit is analog and digital mixed circuits, which can be integrated into the MCP (Multi-Chip Package) package with the processing unit. The reset circuit and power regulator are analog circuitry, which can also be integrated into the MCP (Multi-Chip Package) package with the processing unit.

The nature of mixed signal IC technology allows the hybrid integration of both analog and digital circuits. Therefore, higher integration can be incorporated into the same die for processing unit 2A which includes input/output interface circuit 5A, flash memory controller 21, reset circuit 23 and power regulator 22.

In an alternative embodiment, a processing unit 2, input/output interface circuit 5, and power regulator 22 and a reset circuit 23 are integrated or partially integrated using Multi-Chip Package technology or mixed signal IC technology.

Advances in flash technology have created a greater variety of flash memory device types that vary for reasons of performance, cost and capacity. For example, Multi Level Cell (MLC) Flash memory devices have higher capacity than Single Level Cell (SLC) flash memory devices for the same form factor. AND or Super-AND flash memory have been created to circumvent intellectual property issues associated with NAND flash memory. Also, a large page size (2K Bytes) flash memory has better write performance against a small page size (512 Bytes) flash memory. Further, the rapid development of flash memory has resulted in devices with higher capacities. To support these various flash memory types, the flash memory controller must be able to detect and access them accordingly.

Figure 4:
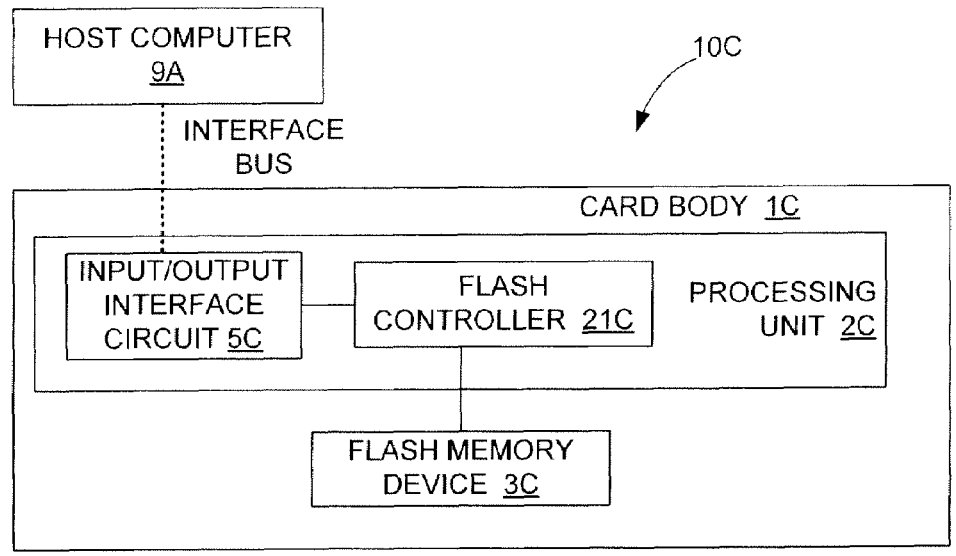
FIG. 4 is a schematic circuit block diagram illustrating an electronic data flash card according to another embodiment of the present invention.

The various novel aspects described above may be implemented together or independently while remaining within the spirit and scope of the present invention. For example, FIG. 4 shows an electronic data flash card (or electronic data storage medium, or integrated circuit card) 10C according to yet another embodiment of the present invention. Electronic data flash card 10C is adapted to be accessed by a host computer 9A via an interface bus or card reader (i.e., communication link), and includes a card body 1C, a processing unit 2C including a flash memory controller 21C and an input/output interface circuit 5C, and one or more flash memory devices 3C in according to one or more of the embodiments described above. Electronic data flash card 10C could be the functional subsystem for electronic data flash card 10A (described above), and also could be a functional subsystem for other applications.

Flash memory device 3C is controlled through commands generated by flash memory controller 21C, and stores a data file in the flash memory device.

Processing unit 2C is connected to flash memory device, said input/output interface circuit. Flash memory controller 21C inside processing unit 2C controls flash memory device 3C utilizing one or more of the methods described above. In one embodiment, flash memory controller 21C executes a flash type algorithm that determines if flash memory device 3C is supported by the static portion of the flash memory controller logic stored in ROM (not shown), and reads a dynamic portion of flash memory controller logic stored in flash memory device 3C if the flash type is "new".

According to another aspect, input/output interface circuit 5C is activated so as to establish USB Bulk Only Transport (BOT) communications with host computer 9A via the interface link. There are four types of USB software communication data flow between a host computer and the USB interface circuit of the flash memory device (also referred to as a "USB device" below): control, interrupt, bulk, and isochronous. Control transfer is the data flow over the control pipe from the host computer to the USB device to provide configuration and control information to a USB device. Interrupt transfers are small-data, non-periodic, guaranteed-latency, device-initiated communication typically used to notify the host computer of service needed by the USB device. Movement of large blocks of data across the USB interface circuit that is not time critical relies on Bulk transfers. Isochronous transfers are used when working with isochronous data. Isochronous transfers provide periodic, continuous communication between the host computer and the USB device. There are two data transfer protocols generally supported by USB interface circuits: Control/Bulk/Interrupt (CBI) protocol and Bulk- Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a USB flash device transfers high-speed data to and from host computer using only the Bulk-Only Transfer (BOT) protocol. BOT is a more efficient and faster transfer protocol than CBI protocol because BOT transport of command, data, status rely on Bulk endpoints in addition to default Control endpoints.

As with previous embodiments described above, processing unit 2C is selectively operable in a programming mode, where processing unit 2C causes input/output interface circuit 5C to receive the data file from host computer 9A, and to store the data file in flash memory device 3C through write commands issued from host computer 9A to flash memory controller 21C, a data retrieving mode, where processing unit 2C receives the data in flash memory device 3C through read command issued from host computer 9A to flash memory controller 21C and to access the data file stored in flash memory device 3C, and activates input/output interface circuit 5C to transmit the data file to host computer 9A, and a data resetting mode where the data file is erased from flash memory device 3C.

Advantages of the intelligent processing unit 2C in accordance with the present invention include:

(1) providing high integration, which substantially reduces the overall space needed and reduces the complexity and the cost of manufacturing;

(2) by storing the portion of software program along with data in flash memory which results in the cost of the controller being reduced; and (3) utilizing more advanced flash control logic which is implemented to raise the throughput for the flash memory access.

The following terms are defined as indicated in accordance with the present invention. Block: A basic memory erase unit. Each block contains numerous sectors, e.g., 16, 32, 64, etc. If any sector encounters write error, the whole block is declared a bad block and all valid sectors within the block are relocated to another block. Sector: A sub-unit of a block. Each sector typically has two fields—a data field and a spare field. Obsolete sector: A sector that is programmed with data but the data has been subsequently updated. When the data is updated, the obsolete data remains in the obsolete sector and the updated data is written to new sectors, which become valid sectors. Non-valid blocks: Blocks that contain obsolete sectors. Valid sector: A sector that has been programmed with data and the data is current, i.e., not obsolete. Wear leveling: A method for evenly distributing the number of times each block of flash memory is erased in order to prolong the life of the flash memory. Flash memory can be block erased only a limited number of times. For example, one million times is a typical maximum number of erases for NAND flash memory. Spare blocks: Reserved space in flash memory. Spare blocks enable flash memory systems to prepare for bad blocks. Cluster: Multiple data sectors used as file access pointers by an operating system to improve memory performance. In small mass-storage memory operation, a cluster normally is a combination of two data sectors, which is a minimum file size unit. 1 k byte is a typical cluster size for small blocks of memory (i.e., 512 bytes per sector), and 4 k bytes is a cluster size for larger blocks of memory (i.e., 2,112 bytes per sector). FAT: File allocation table having file address-linked pointers. A cluster is the unit for a FAT. For example, FAT16 means that a cluster address can be 16 bits. Directory and subdirectory: File pointers as defined by an operating system. Master boot record (MBR): A fixed location to store a root directory pointer and associated boot file if bootable. This fixed location can be the last sector of the first block, or the last sector of the second block if first block is bad. Packet: A variable length format for a USB basic transaction unit. A normal transaction in the USB specification typically consists of three packets—a token packet, a data packet, and a handshake packet. A token packet has IN, OUT, and SETUP formats. A data packet size can be varying in size, e.g., 64 bytes in USB revision 1.1, and 512 bytes in USB revision 2.0. A handshake packet has ACK or NAK formats to inform host computer of the completion of a transaction. Frame: A bulk transaction that is used that has a high priority for occupying a frame if USB traffic is low. A bulk transaction can also wait for a later frame if USB traffic is high. Endpoint: Three endpoints include control, bulk-in, and bulk-out. The control endpoint is dedicated to system initial enumeration. The bulk-in endpoint is dedicated to host system read data pipe. The bulk-out endpoint is dedicated to a host system write data pipe. Command block wrapper (CBW): A packet contains a command block and associated information, such as Data Transfer Length (512 bytes for example from byte 8 to 11). A CBW always starts at the packet boundary, and ends as short packet with exactly 31 bytes (byte 0 to 30) transferred. All CBW transfers shall be ordered with LSB (byte 0) first. Command Status Wrapper (CSW): A CSW starts at packet boundary. Reduced block command (RBC) SCSI protocol: a 10 byte command descriptor.

Figure 5:
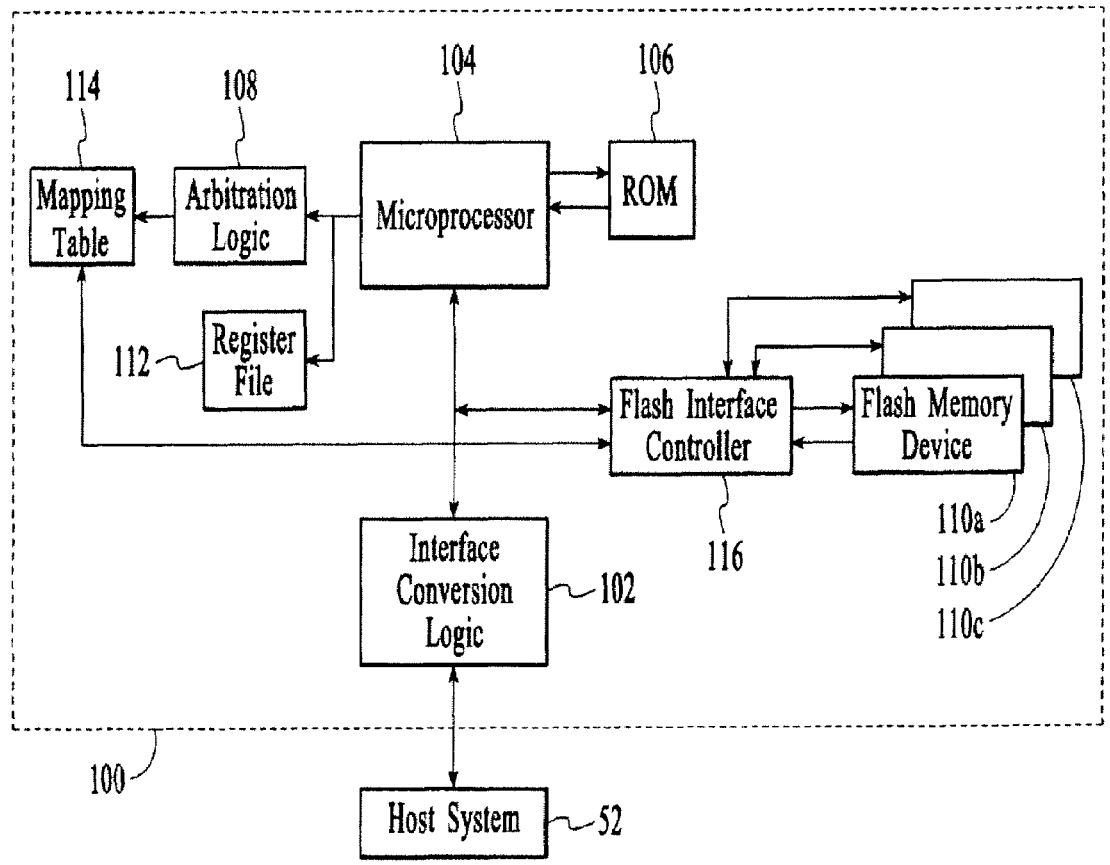
FIG. 5 is a block diagram of a flash memory system in accordance with another embodiment of the present invention.

FIG. 5 is a block diagram showing a electronic data flash card (memory system) 100 in accordance with another embodiment of the present invention. Flash memory system 100 interfaces with a host system 52 via interface conversion logic 102, which handles data and timing alignment for a microprocessor 104. Interface conversion logic 102 can be compatible with various formats such as USB, PCI-Express, CF, SD, MMC, MS, IDE, etc., depending on the specific application. Host system 52 can be a personal computer (PC), digital camera, MP3 player, etc.

Microprocessor 104 executes read, write, and erase operations, block management operations, as well as other housekeeping operations in the flash memory system 100. The block management operations involve copy and erase operations, which are performed in the background, i.e., hidden from the host system 52. A read-only memory (ROM) 106 stores code for executing the operations executed by the microprocessor 104.

Microprocessor 104 utilizes arbitration logic 106 to perform block management operations separately for each flash memory device 110a, 110b, and 110c of the flash memory system 100. The arbitration logic can be implemented using hardware logic or a programmable logic device such as field programmable gate arrays (FPGAs).

Register file 112 assigns logical block addresses (LBAS) to the flash memory devices 110a-c. A mapping table 114 provides an index of information associated with the flash memory devices 110a-c. Such information includes, for example, LBAs, device numbers, PBAs, valid bits, and obsolete bits. A flash interface controller 116 interfaces with the flash memory 110a-c to carry out commands from the processor 104. Such commands include read, write, and erase operations.

Figure 6:
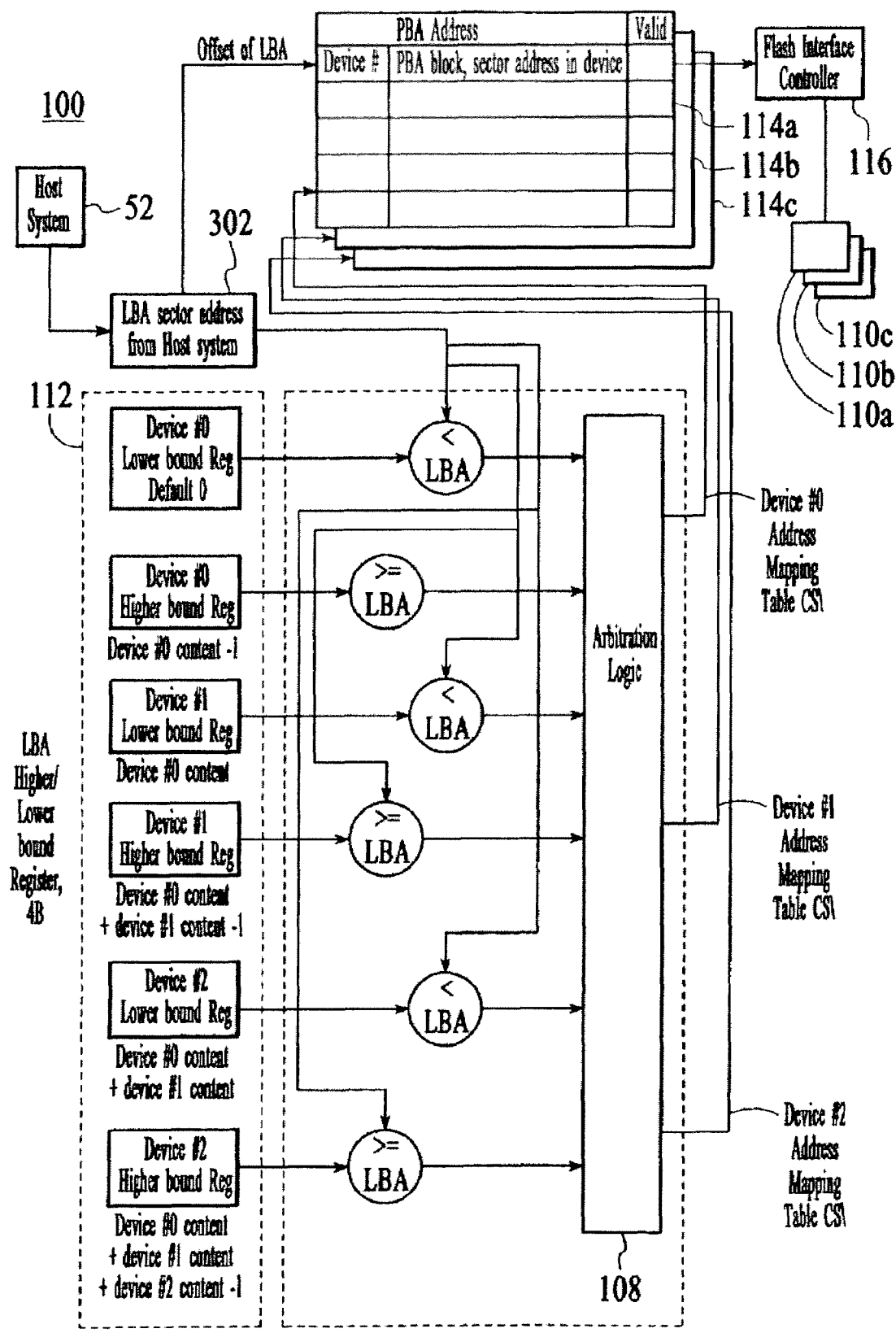
FIG. 6 is a block diagram showing in more detail the interface between the arbitration logic, the register file, and the mapping table of the flash memory system of FIG. 5 in accordance with the present invention.

FIG. 6 is a block diagram showing in more detail the interface between arbitration logic 108, register file 112, and mapping table 114 of the flash memory system 100 of FIG. 5 in accordance with the present invention. Host system 52 typically sends an LBA 302 to the flash memory system 100. LBA 302 includes a sector-offset address.

Register file 112 associates each LBA 302 with a particular flash memory device number. For example, LBAs within a certain first address range are associated with flash memory device number 110a, LBAs within a certain second address range are associated with flash memory device number 110b, etc. Arbitration logic 108 sends the LBA and the associated device number to mapping table 114. The address capacity of each flash memory device is pre-programmed into corresponding registers 114a-114c to provide LBA assignments. Once the physical block address (PBA) is identified by arbitration logic 108 for each particular flash memory device, all read/write operations are performed internally within that device.

Mapping table 114 translates each LBA to a corresponding PBA, and outputs the device number and PBA to flash interface controller 116. Mapping table 114 of an index that comprises one or more look-up tables (LUTs), which can be implemented using volatile random access memory (RAM), such as static RAM (SRAM). In a specific embodiment, there is one mapping table 114a, 114b, and 114c for each flash memory device 110a, 110b, and 110c, respectively. For example, table 114a stores PBA information only for flash memory device 110a, table 114b stores PBA information only for flash memory device 110b, and table 114c stores PBA information only for flash memory device 110c. Mapping table 114 translates the LBA into a particular PBA for the device number provided by the arbitration logic 108. Mapping table 114 also provides valid bit values. The valid bit values are reset to zero during power up. After power up, flash memory 110 is first scanned to reconstruct the mapping table 114.

During an initialization process, a maximum number of erase operations for a particular sector is programmed into register file 112 for address arbitration. The flash interface controller 116 generates a sequence of timing signals to a particular flash memory device 110 to carry out write and erase operations associated with block management of the particular flash memory device 110.

Because each register of flash memory devices 110a-c can be independently programmed, the individual flash memory devices 110a-c of flash system 100 can have different data storage capacities. Mixing brands of flash memory devices is also possible. This flexibility reduces the overall manufacturing costs. The page size, which is the total number of bytes per physical sector, should be the same (e.g., 512 bytes or 2048 bytes) within each of flash memory devices 110a-c.

Figure 7:
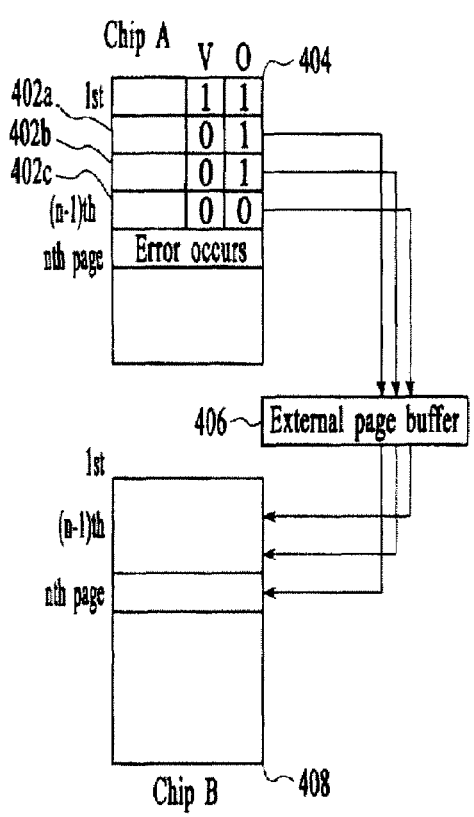
FIG. 7 is a block diagram showing a conventional block management operation.

FIG. 7 is a block diagram showing a conventional block management operation. As is shown, valid data stored in sectors 402a, 402b, and 402c of one block 404 of flash memory device A. During a block management operation (e.g., bad block replacement, obsolete block recycling, wear leveling) the valid data stored in sectors 402a, 402b, and 402c are relocated if the sectors 402a, 402b, and 402c become bad, obsolete, or need to undergo wear leveling. Block management operations can be generally referred to as house-keeping operations. They occur in the background to facilitate write operations. In this example, the block management operation is a bad block operation involving bad block replacement.

As is shown, the valid data is relocated (i.e., copied) to an external buffer 406. A search for available good (i.e., functional) blocks in other flash memory devices is then conducted. Conventional flash memory systems treat multiple flash memory devices as a single global unit. Accordingly, the blocks of all of the flash memory devices are arranged in a global address scheme such that all of the flash memory devices are searched. When available good sectors are found in block 408 of another flash memory device B, the valid data can then be copied to those good sectors of the flash memory device B. The external buffer 406 is utilized in a similar fashion during other block management operations.

Figure 8:
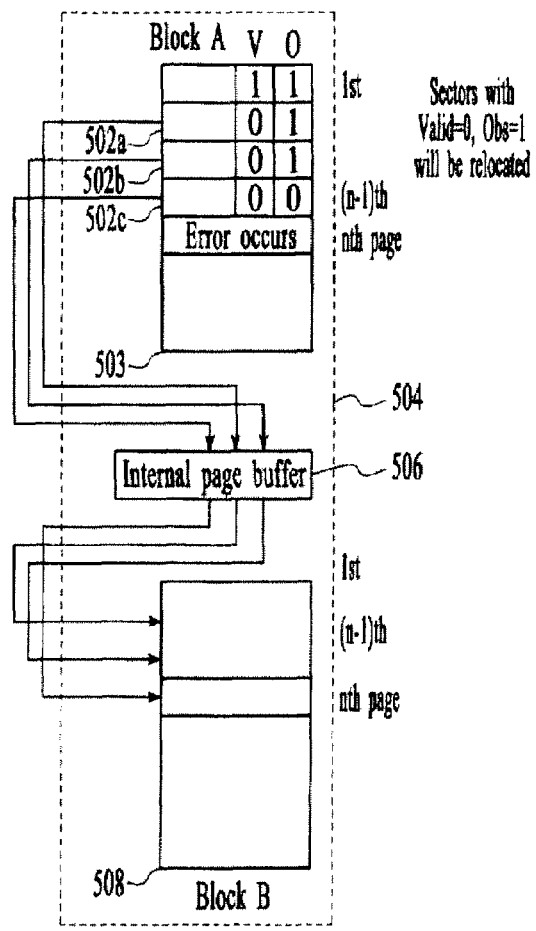
FIG. 8 is a block diagram showing a block management operation in accordance with the present invention.

FIG. 8 is a block diagram depicting a block management operation in accordance with the present invention. As is shown, valid data is stored in sectors 502a, 502b, and 502c of one block 503 in a flash memory device 504. During a block management operation, the valid data stored in sectors 502a, 502b, and 502c are relocated.

In accordance with the present invention, block management operations are performed separately for each flash memory device and are performed internally within the boundaries of each flash memory device. In other words, during block management operations, valid data stored in flash memory device 110a is relocated to optimal locations within the same flash memory device 110a (i.e., it is not transferred to other flash memory devices 110b or 110c). By restricting valid data relocation of one flash memory device to within itself, the present invention improves overall system performance compared to that of conventional block management operations, in which valid data can be relocated to different flash memory devices. A problem with the conventional block management operations is that they require a broader search for available good blocks, which requires searching multiple flash memory devices. Also, conventional block management operations require the use of an external buffer (e.g., page buffer 406 in FIG. 7). Transferring valid data from one device to an external buffer and then to another flash memory device adds time to the overall operation. The present invention avoids this problem by performing block management operations separately for each flash memory device such that the block management operations are performed internally within each flash memory device.

Another benefit of the present invention is that block management operations can occur simultaneously within multiple flash memory devices to further increase the performance of the flash memory system. For example, a first data relocation operation can be performed in a first flash memory device while a second data relocation operation is being performed in a second flash memory device. This also enables different flash memory devices to be erased and programmed simultaneously. Such an increase in system parallelism significantly increases the performance of the flash memory system.

In this example, the block management operation is a bad block operation involving bad block replacement. The valid data stored in sectors 502a, 502b, and 502c are relocated if the sectors 502a, 502b, and 502c become bad. In this specific embodiment, the valid data is copied to an internal buffer 506. The internal buffer 506 is a properly functioning volatile memory sector within the flash memory device 504. In a specific embodiment, blocks of volatile memory sectors are reserved to provide the internal buffer 506 in each flash memory device. This reduces the need for external search, i.e., searches beyond the boundaries of a flash memory device. A search for available good blocks in another portion of the same flash memory device 504 is then conducted. The blocks of all of the flash memory devices are arranged in a distributed address scheme, as described in FIG. 8, and searches are directed to the boundaries of a single flash memory device.

When good blocks are found, the valid data can then be copied to one or more of the good blocks. In either case, the search time is greatly reduced because it is a one-chip search as compared to the conventional multiple-chip search shown in FIG. 7. Also, because the bad block operation occurs within a single flash memory device 504, the time to relocate valid data is greatly reduced. In accordance with the present invention, this eliminates the need for an external buffer. Accordingly, the relocation time is greatly reduced because the valid data need not be transferred external to flash memory device 504.

Internal buffer 506 is utilized in a similar fashion during other block management operations in accordance with the present invention. Alternatively, during a block management operation, the valid data can be relocated directly to good sectors without having to be first stored in internal buffer 506.

In accordance with the present invention, each flash memory device functions as an individual addressing unit, and block management operations occur within the boundaries of each flash memory device. Accordingly, another benefit of the present invention is that flash memory devices of different capacities can be used within the same flash memory system.

Figure 9:
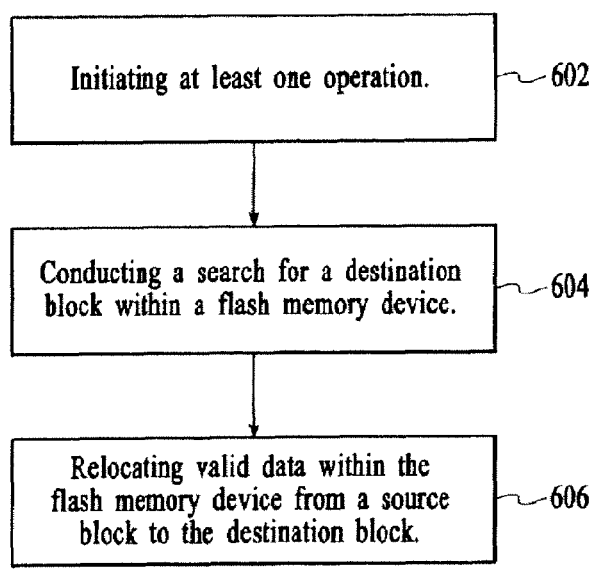
FIG. 9 is a high-level flow chart showing a method for managing bad blocks in flash memory in accordance with the present invention.

FIG. 9 is a high-level flow chart showing a method for managing blocks in flash memory in accordance with the present invention. First, at least one operation is initiated in a flash memory system that includes a plurality of flash memory devices, in step 602. In this specific embodiment, the operation is a block management operation. Next, a search for a destination block within a flash memory device is conducted, in step 604. Next, valid data within the flash memory device is relocated from a source block to the destination block, in step 606. Accordingly, block management operations are performed for particular flash memory devices of the plurality of flash memory devices. When multiple block management operations are performed for multiple flash memory devices, a separate block management operation is performed for each particular flash memory device. This allows for separate and simultaneous block management operations for each particular flash memory device.

Figure 10:
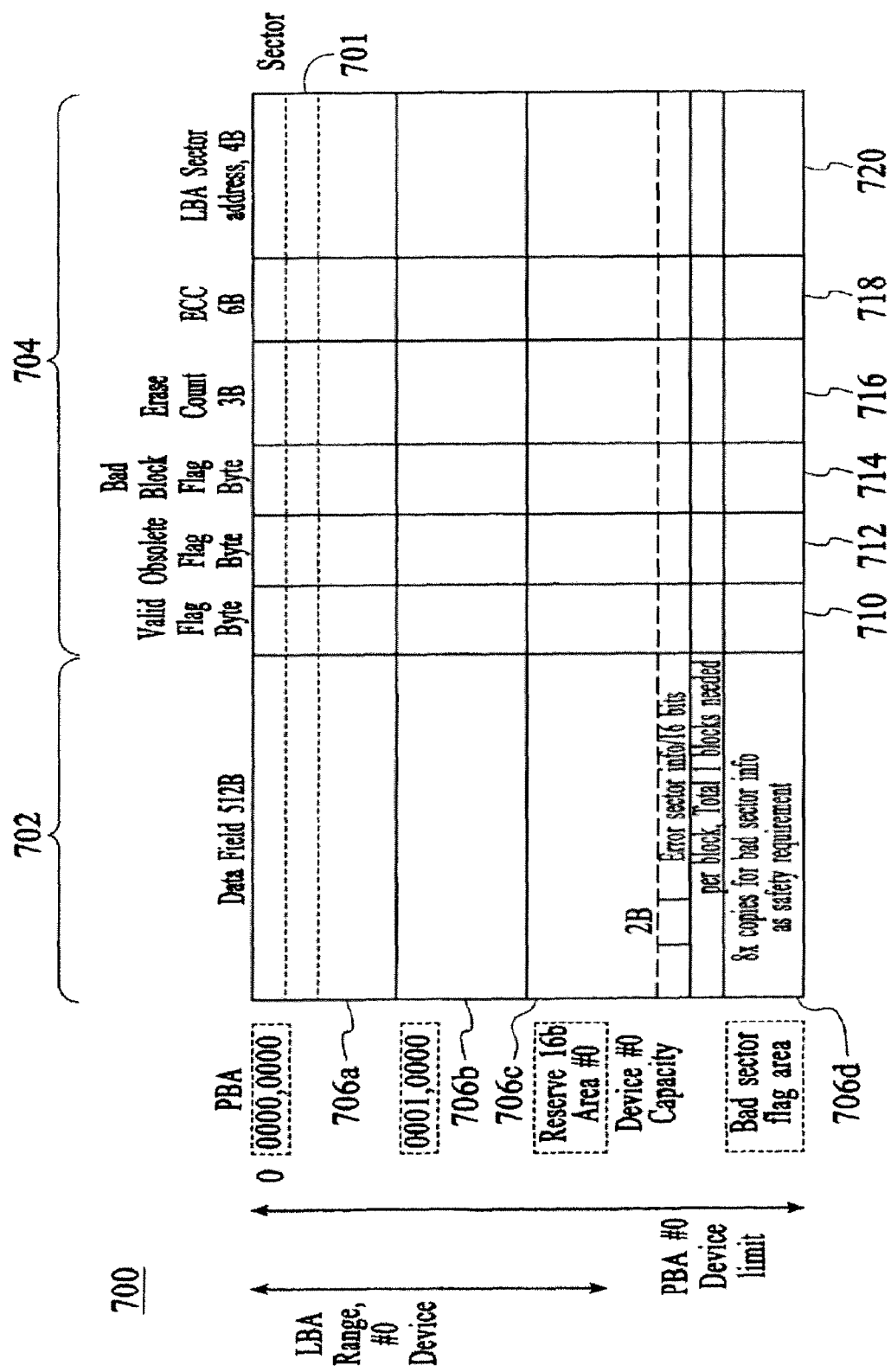
FIG. 10 is a block diagram showing in more detail a flash memory device, which can be used to implement a flash memory device of FIGS. 6 and 8 in accordance with the present invention.

FIG. 10 is a block diagram showing in more detail a flash memory device 700, which can be used to implement a flash memory device of FIG. 5 in accordance with the present invention. Flash memory device 700 has as assigned range of LBAs, where the LBA range is based on arbitration logic 108 as described in FIG. 5. The PBAs for the flash memory device 700 begins at zero and increases to a maximum capacity for the flash memory device 700. Exemplary blocks 706a, 706b, 706c and 706d are shown. 706a and 706b are the first and second PBA blocks respectively whereas 706d being the last PBA block.

In this specific embodiment, a sector (commonly referred to as a page) 701 consists of 528 bytes, 512 bytes of data field and 16 bytes of spare field. Flash memory device 700 has a data structure that comprises a data field 702 and a spare field 704 for each PBA 706a, 706b, 706c, and 706d. Each field holds a certain number of bytes and the specific number will depend on the application. For example, a data field may have 512 bytes, 2,112, or more bytes, and the spare field can have 16, 64, or more bytes.

Data field 702 stores raw data, and spare field 704 stores information related to memory management. Spare field 704 includes a valid sector field 710, an obsolete sector field 712, a bad block indicator field 714, an erase count field 716, an error correction code (ECC) field 718, and an LBA sector address field 720. Valid sector field 710 indicates whether the data in the sector is valid for reading. Obsolete sector field 712 serves as a flag that indicates whether the data in the sector is obsolete. The obsolete flag can be modified by a subsequent write or erase operation. Bad block indicator field 714 indicates bad blocks. In one embodiment, a 0 bit stored in bad block indicator field 714 is used to indicate that the block is damaged. A bad block occurs when an attempt to write to a particular sector or to erase a particular block fails. In a specific embodiment, the bad block indicator is set by the manufacture. The firmware of the flash memory system scans the first sector of each block to determine the accessibility of data. Information associated with the complete scan is then stored in the last block of each flash memory device.

In this specific embodiment, two bytes (16 bits) are used to record bad block information of each block (16 sectors). Two sectors (1024 bytes) are used to record bad block information of this flash memory device (512 blocks maximum). For higher reliability, eight copies of the bad block information are stored to avoid bad sector incidents during the recording of flags. These eight copies are stored in the last block location 706d of this flash memory device for faster accessibility. A special bad sector indicator field 714 is located in the last block 706d so that it is more easily read by the firmware of the flash memory system.

Erase count field 716 records the number of times a block is erased throughout the service life of the flash memory device. Erase count field 716 stores three bytes, and can record 16 million block erase operations. ECC field 718 stores as six ECC bytes to assure data consistency. EEC is a sophisticated method that is utilized for error detection and correction, and is known in the art. LBA sector field 720 is dedicated for power backup or system re-entry usage. Because the mapping table of the flash memory system is stored in volatile memory and thus does not preserve the valid sector information during power loss, LBA sector address field 720 is used to reconstruct the mapping table during system initialization and power failure. LBA sector address field 720 records previous write operations as well as valid sector and obsolete sector information to reconstruct the mapping table. The firmware of the flash memory system can repair the dangling clusters when a new data structure is setup. This is accomplished by checking a FAT table stored in the flash array of the flash memory device.

Figure 11:
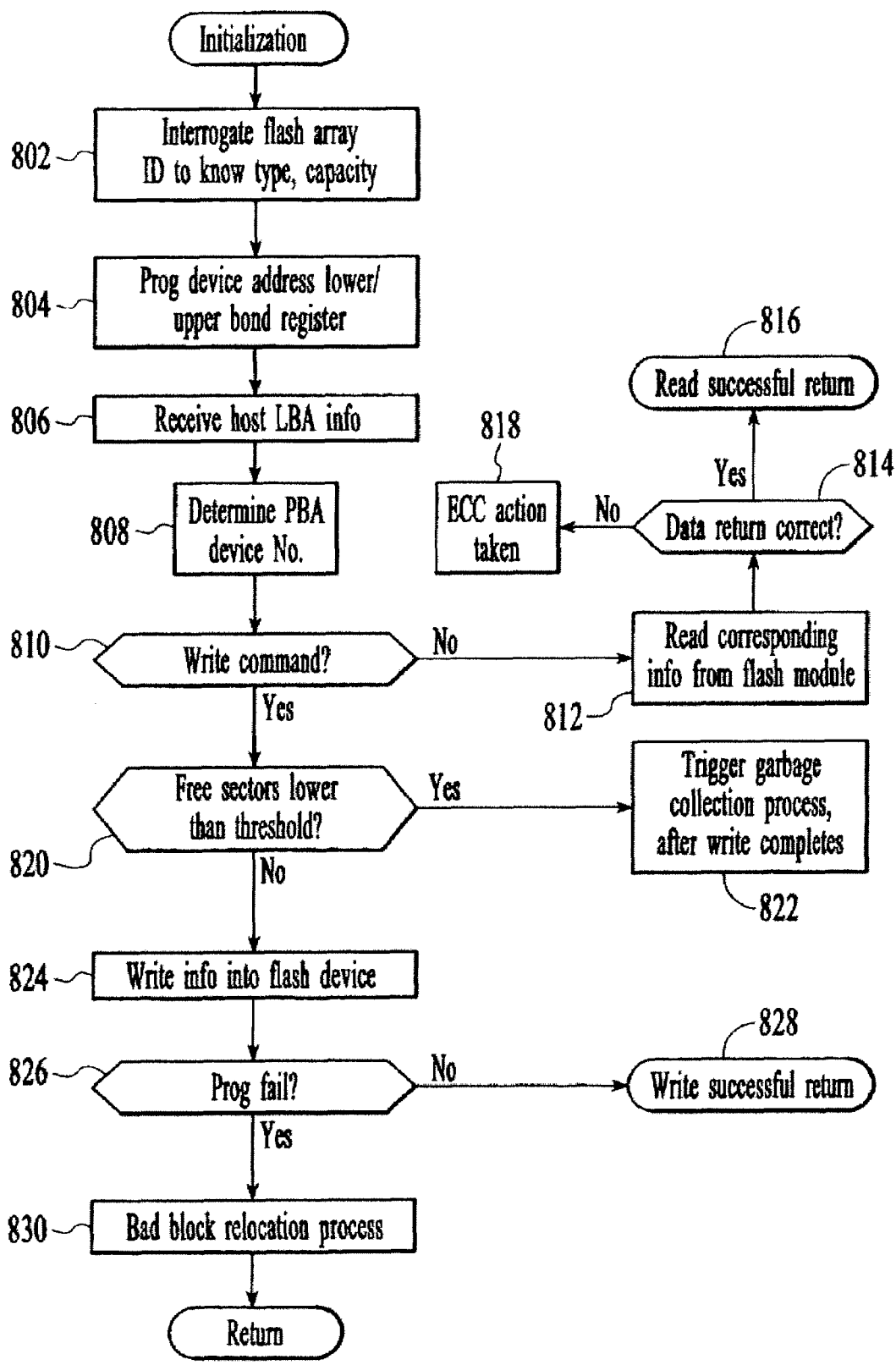
FIG. 11 is a flow chart showing a method for accessing data in accordance with the present invention.

FIG. 11 is a flow chart showing a method for accessing data in accordance with the present invention. After initialization of the flash memory system, a flash array identification (ID) is interrogated to determine the capacity of the flash array of a flash memory device, in step 802. Also, the PBAs of each flash memory device are scanned to determine existing bad sectors (step 802). This determination can be accomplished by reading the bad block indicator field.

A range of LBAs is programmed into the register file of the flash memory controller, in step 804. In a given flash memory device, the range of PBAs is larger than the range of LBAs because some space in the flash memory device is reserved for bad block replacement. For example, 10% of a flash array is a reasonable number of reserved space.

Next, an LBA sector address, data, and a command is received from a host system, in step 806. A cluster data buffering and post-write cache scheme is utilized to enhance the performance of the flash memory system. Next, a flash memory device number and a PBA are determined by the mapping table, in step 808. Next, a command from the host system is analyzed, in step 810. If the command is a read command, a read operation is performed, in step 812. Then, the data from the read operation is checked, in step 814. The data is checked using the bytes in the ECC field. If the data is correct, the data is returned to the host system, in step 816. If the data from the read operation is not correct, an EEC operation is performed to correct the data, in step 818.

If the command is determined to be a write command (Yes in step 810), a write operation is performed. A write operation requires significantly longer time to perform than a read operation. For example, a write operation can be twenty times longer than a read operation. First, free (i.e., available) sectors are checked, in step 820. If the number of free sectors is lower than the free sector threshold value, blocks are recycled in a garbage collection operation, in step 822.

If the number of free sectors is not lower than the free sector threshold value, data is written in the flash memory device, in step 824. Upon completion of the write operation, it is determined whether the write operation succeeded or failed, in step 826. If the write operation succeeded, the write operation terminates, in step 828. If the write operation failed, meaning the block is bad, and a bad block operation is then performed, in step 830.

Generally, when a block is bad, the data in the sector is not reliable. A block is determined to be a bad block even if only one sector in that block is bad. To ensure data reliability, data will no longer be assigned to the bad block and is reassigned to a good block. Accordingly, data in the valid sectors of the bad block are transferred to the good block for further reference. This operation is referred to as bad block replacement. A copy-back command is issued that is internal to the flash memory device to reduce the transaction time.

Figure 12:
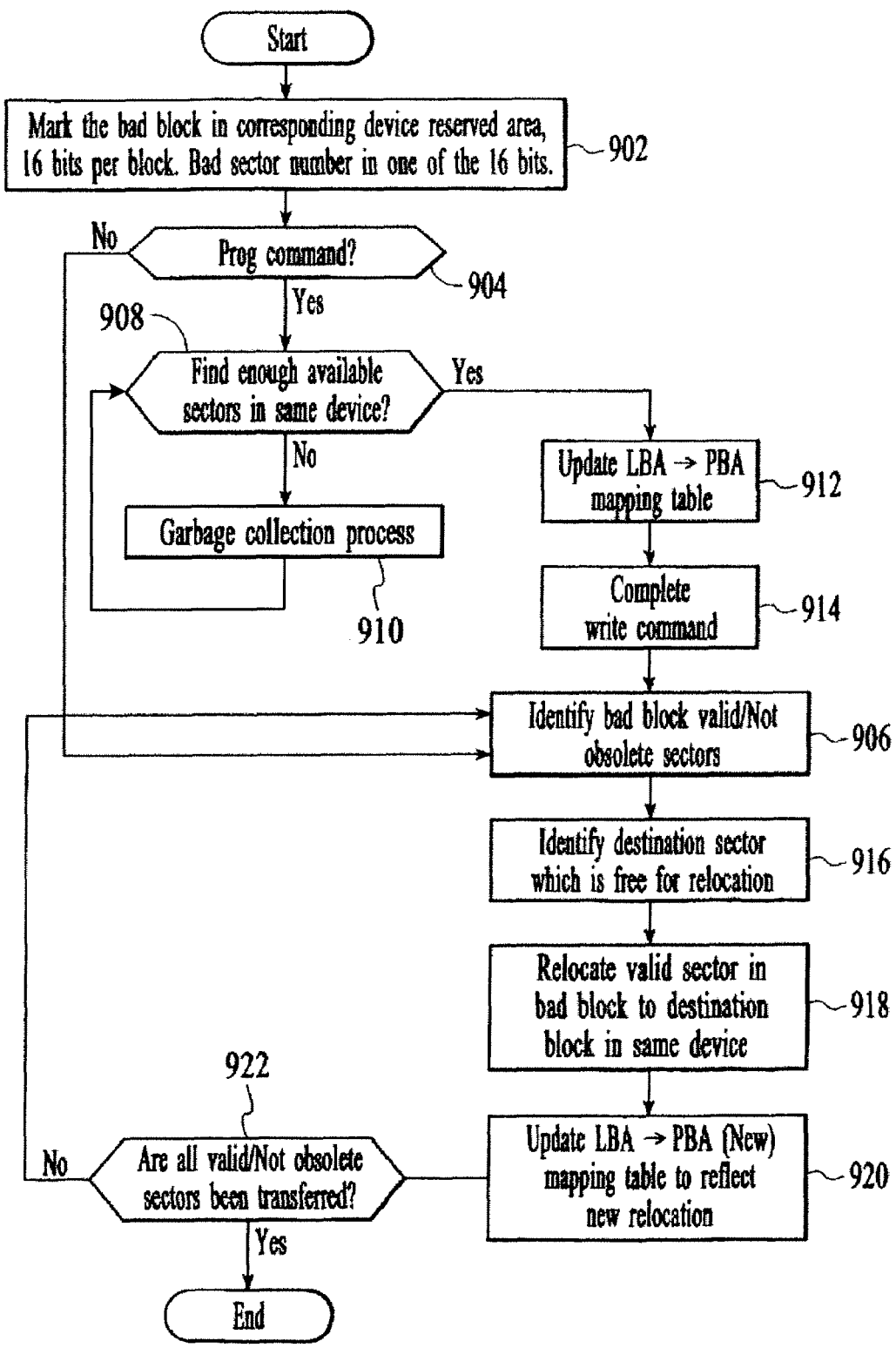
FIG. 12 is a flow chart showing a method for replacing bad blocks in accordance with the present invention.

FIG. 12 is a flow chart showing a method for replacing bad blocks in accordance with the present invention. The bad sector location of the bad block is recorded in a reserved area in the last two blocks of the flash memory device, in step 902. In a specific embodiment, there are 16 sectors per block. There are sixteen bits where each bit is associated with one of the sixteen sectors. The bits are used to indicate the failed sectors. Accordingly, if any one of the bits is 0, indicating that the associated sector is bad, then the entire block is determined to be bad. Programming the bit location is accomplished by first reading out the whole sector, then writing into it the original plus the bits values. The firmware generates four copies to ensure correctness. All eight blocks (4×2 blocks) are in the last space of each flash memory device. Each bit is set once during the lifetime of the sector to indicate the bad sector location.

Next, it is determined whether there is a write command, in step 904. If a read operation fails and there is no write command, the valid data in the sectors in the bad block are identified, in step 906. If there is a write command (Yes in step 904), a search for available sectors within the same device is executed, in step 908. If there is not a sufficient number of available sectors, a garbage collection operation is executed, in step 910, until there is a sufficient number of available sectors. If there is a sufficient number of available sectors, the LBAs of the mapping table are updated, in step 912. Next, the write operation is complete, in step 914. After the write operation is completed, the valid data in the sectors of the bad block are identified, in step 906. This process is carried out whenever a write or erase operation fails.

Next, a destination sector of the good block to which the valid data of the bad block has been reassigned is identified, in step 916. Next, the valid data is relocated (i.e., copied) to the destination sector, in step 918. During relocation, a copy-back action is taken within the flash memory device to avoid external traffic and to enhance the performance of the flash memory system. Next, the mapping table in the flash memory controller is updated to reflect the change for future access of the data, in step 920. Next, it is determined if all of the valid data from the bad block has been transferred to the good block, in step 922. In not, the operation loops back to block 906. If all the valid data have been transferred, the bad block replacement operation terminates.

Figure 13:
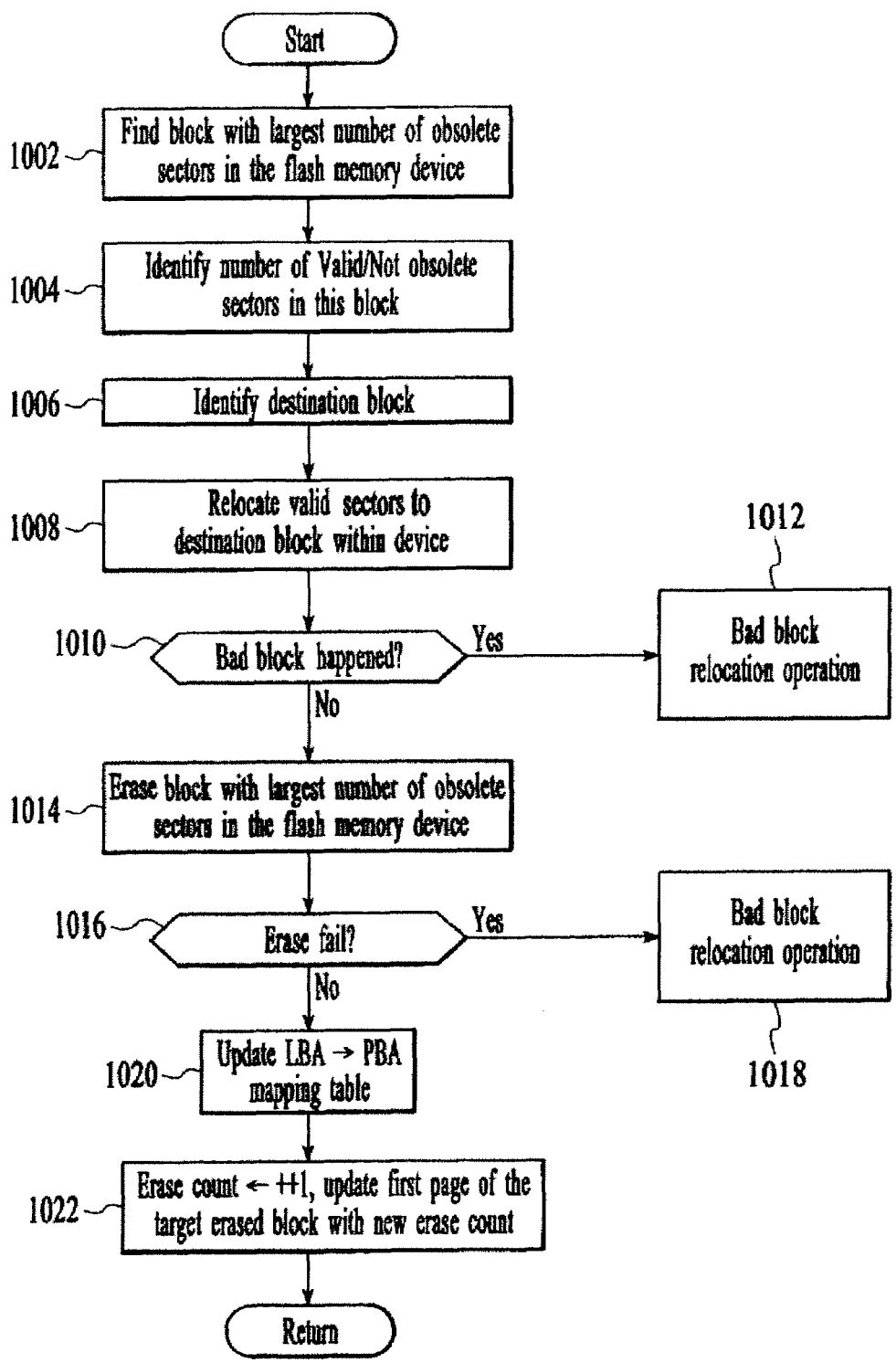
FIG. 13 is a flow chart showing a method for a garbage collection operation in accordance with the present invention.

FIG. 13 is a flow chart showing a method for a garbage collection operation in accordance with the present invention. The garbage collection operation is a one-chip operation within the boundary of each flash memory device. Accordingly, multiple garbage collection operations can occur simultaneously within different flash memory devices. First, a search occurs within a flash memory device to locate the obsolete block with the largest number of obsolete sectors, in step 1002. Specifically, the firmware scans through the obsolete sector fields to determine the number of obsolete sectors in each block. The results of the search are stored in a register. The registers indicate the obsolete blocks with the largest number of obsolete sectors. For example, there can be four registers to indicate the four obsolete blocks with the largest number of obsolete sectors. The results are also stored with LBA values to update address mapping tables. In the mean time a different set of registers are also set to record the four valid blocks with the largest available sectors in this device. Because the purpose is erasing one obsolete (source) block after relocation of valid sectors to one destination (valid) block. These four register sets provide the best match for source and destination block selection.

Next, the number of valid sectors of the source block is identified, in step 1004. Next, addresses of valid sectors are identified, in step 1006. The valid sectors associated with these addresses are referred to as destination sectors. Next, a copy-back operation is executed to copy the valid data from the obsolete (source) block to the destination sectors, in step 1008. During the copy-back operation the valid data can be temporarily stored in an internal buffer.

Next, it is determined whether any bad sectors have manifested during the garbage collection operation, in step 1010. If a bad sector has manifested, a bad block relocation operation is executed, in step 1012. If no bad sector has manifested, the source block (one having the largest number of obsolete sectors) is erased and the bits of the block are changed to 1, in step 1014. Next, it is determined if the erase operation has failed, in step 1016. If the erase operation has failed, a bad block relocation operation is executed, in step 1018. If the erase operation has not failed, garbage collection operation of one obsolete block is completed, mapping table is updated to reflect the modification for future write operations, in step 1020. Next, the erase count for the erased block is incremented in the erase count field, in step 1022.

Figure 14:
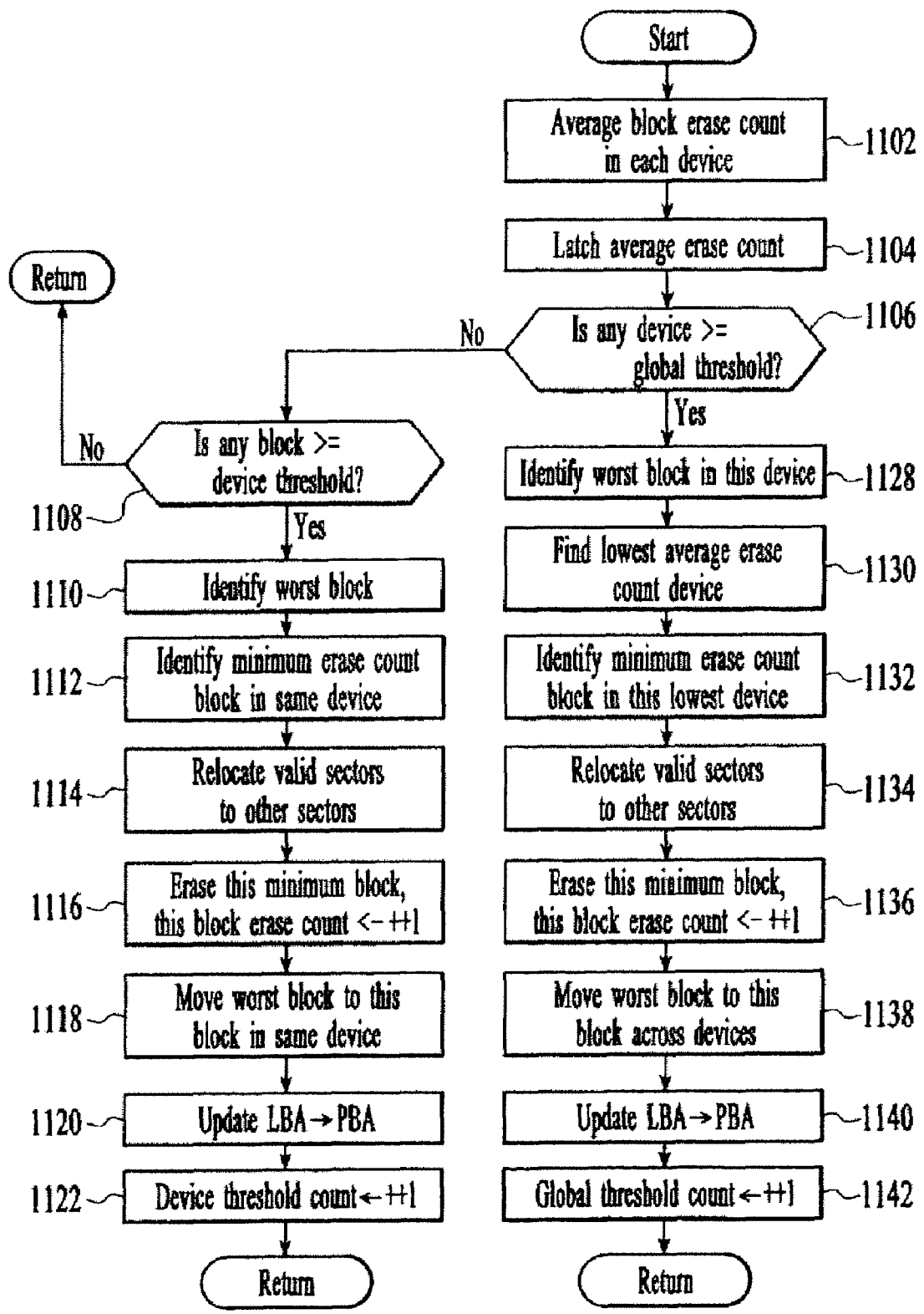
FIG. 14 is a flow chart showing a method for a wear leveling operation in accordance with the present invention.

FIG. 14 is a flow chart showing a method for a wear leveling operation in accordance with the present invention. The wear leveling operation occurs in the background while there is no data-transfer request from the host system. Pending data-transfer request from the host system may occur while the wear leveling operation is in process. The wear leveling operation generally relocates valid data from blocks with low erase counts to blocks with high erase counts. The blocks with low erase counts are then erased and their erase counts are incremented. This evens out the erase counts of blocks by bring the blocks with the highest erase counts closer to the average device erase count. This delays any given block from reaching its maximum erase count.

First, the erase count in the erase count field for every block is read by the firmware and the average device erase count is determined for each flash memory device, in step 1102. Then the average global erase count for all flash memory devices is determined, also in step 1102. The average device erase count values are then stored in a register for each flash memory device, in step 1104. For each flash memory device, if the average device erase count is greater than the value of a device threshold count register, then it is latched-in as the updated device threshold count. Similarly, if the average global erase count is greater than the value of a global threshold count register, then it is latched becoming the updated global threshold count. These are done for future use in step 1104. In a specific embodiment, three registers are designated to save erase count values for each flash memory device. The first register stores the average erase count for a particular flash memory device, referred to as a device erase count. The second register stores the average erase count for a particular flash memory device, referred to as a device threshold count. The third register stores an average erase count value for all of the flash memory devices, referred to as a global threshold count. For example, a device threshold count can be 5,000, and the global threshold count can be 20,000. And these two values are also pre-programmed as part of the initialization process of the flash memory system.

Next, it is determined whether any flash memory device has a device threshold count is greater than or equal to the global threshold count, in step 1106. If not, it is determined whether that device has a device erase count greater than or equal to the device threshold count, in step 1108. If not, the wear leveling operation terminates. If yes, the block with the highest erase count in that device is identified, in step 1110. Next, the block with the lowest erase count in that device is identified, in step 1112. Next, valid data in the block with the lowest erase count is relocated to another block, in step 1114. Next, the block with the lowest erase count is erased and its erase count is incremented, in step 1116. Next, valid data in the block with the highest erase count is relocated to the block with the lowest erase count, in step 1118. Next, the mapping table is updated, in step 1120. Next, the device threshold count is incremented, in step 1122. The wear leveling operation then ends.

Involving multiple flash memory devices in a block management operation of one flash memory device, where valid data is relocated externally from one flash memory device to another. This substantially enhances the overall performance of the flash memory device system. In another specific embodiment, if a particular flash memory device undergoing block management operation has a high erase count compared to other flash memory device, relocating valid data externally from one flash memory device to another is performed to achieve balance among the different flash memory devices. External relocation, however, occurs in addition to internal relocation in accordance with the present invention.

Referring back to block 1106, if there is a flash memory device having a device threshold count that is greater than or equal to the global threshold count, the block with the highest erase count in that device is identified, in step 1128. Next, the flash memory device with the lowest average erase count is identified, in step 1130. Next, the block with the lowest erase count in that device is identified, in step 1132. Next, valid data in the block with the lowest erase count is relocated to another block, in step 1134. Next, the block with the lowest erase count is erased and its erase count is incremented, in step 1136. Next, valid data in the block with the highest erase count is relocated to the block with the lowest erase count, in step 1138. In a specific embodiment, the valid data is moved to another flash memory device. Next, the mapping table is updated, in step 1140. Next, the global threshold count is incremented, in step 1142. The wear leveling operation then ends.

The flash memory controller of the present invention can perform multiple-block data access. The conventional flash memory device has a 512-byte page register built-in. The data written to the flash memory device has to be written to the page register first and then to the flash memory array. The conventional flash memory controller, as well as its firmware, controls the flash memory system access cycles. The conventional flash memory controller transfers one block (512 bytes) of data to the page register of a flash memory device at a time. No other access to the flash memory device is allowed once the 512 bytes page register is filled. Consequently, the conventional flash memory controller, which uses single-block data access, limits the performance of flash memory system.

In accordance with the present invention, the flash memory controller utilizes a 2048 bytes or larger sized page register. The flash memory controller of the present invention functions as a multiple-block access controller by sending multiple blocks of data at a time to a flash memory device to fill up the page register. This significantly improves the performance of data transfer as compared to the conventional single-block data-transfer controller.

The flash memory controller of the present invention can also do dual channel processing to improve performance of the flash memory system further. Dual channeling provides a second channel, or "freeway", for executing transactions between the flash memory controller and the flash memory device. A conventional flash memory controller uses a single memory bus with one or more flash memory devices attached to it. However, the conventional single channel architecture limits the performance of the conventional flash memory controller.

In accordance with the present invention, at least two sets of memory buses are utilized. Each set of memory buses is coupled to separate flash memory devices. The memory controller can access flash memory devices together or separately. As a result, transactions can be executed twice as fast utilizing dual channel processing. Furthermore, each memory bus can also be further expanded to multiple sets of memory buses.

The flash memory controller of the present invention can also interleave operations. A conventional flash memory controller uses a single set of memory buses such that one or more flash memory devices are attached to it. However, the conventional flash memory controller can only access the flash memory devices one at a time, thus has limited performance.

In accordance with the present invention, at least one or two extra sets of memory control signals (such as Chip Enable and Busy) are utilized. Furthermore, a shared memory bus having at least two banks of flash memory devices are attached to the shared memory bus. The flash memory controller of the present invention can access one bank of flash memory devices while the other bank is busy reading or writing. Accordingly, the flash memory controller of the present invention fully utilizes the shared memory bus and thus significantly increases the performance. Furthermore, the number of pins of the flash memory controller is reduced by sharing memory IO and control signals. This minimizes the cost to make flash memory systems.

In accordance with the present invention, one in the art can integrate functions of multiple block access, multiple bank interleaving, and multiple channel operations together in memory access cycles of a single flash memory device to achieve maximum performance.

According to the system and method disclosed herein, the present invention provides numerous benefits. For example, it enables flash memory controllers to greatly fasten the search for available good blocks during block management operations. Also, it enables flash memory controllers to eliminate the need for an external buffer. Furthermore, the flash memory controller provides multiple block data access, dual channel processing, and multiple bank interleaving. Consequently, the speed at which block management operations are performed is greatly increased.

A system and method in accordance with the present invention for managing blocks in flash memory are disclosed. The system and method provide a flash memory controller comprising a processor for performing operations in a flash memory system. Such operations include block management operations, which include the handling of bad blocks, the recycling of obsolete blocks, and the wear leveling operation. The processor can utilize data from arbitration logic to perform each of these operations for particular flash memory devices of a flash memory system. Since each of these operations occurs within a particular flash memory device, the processor can utilize data from the arbitration logic to direct a search for available good blocks to the particular flash memory device. Also, the processor can utilize an internal buffer within the flash memory device to store valid data during the search before the valid data is relocated. As a result, the search time for available good blocks is greatly shortened and the need for an external buffer is eliminated. Consequently, the speed at which block management operations are performed is significantly increased.

Although the present invention disclosed herein is described in the context of an electronic data flash card with or without fingerprint verification capability, the present invention may apply to other types of memory systems and still remain within the spirit and scope of the present invention. In addition, although the present invention disclosed herein is described in the context of the USB standard, the present invention may apply to other standards and still remain within the spirit and scope of the present invention. Further, embodiments of the present invention can be implemented using hardware, software, a computer readable medium containing program instructions, or combination thereof. Accordingly, many modifications may be made by one of ordinary skill in the art without departing from the spirit and scope of the appended claims.

We claim:

1. An electronic data flash card adapted to be accessed by a host computer that is capable of establishing a communication link, said electronic data flash card comprising:

a card body;

one or more flash memory devices mounted on the card body, the flash memory device including a plurality of non volatile memory cells for storing a data file, said memory cells being arranged in at least one of a plurality of memory blocks, a plurality of pages, and a plurality of sectors;

an input/output interface circuit mounted on the card body for establishing communication with the host computer, wherein the input/output interface circuit includes a Universal Serial Bus (USB) interface circuit including means for transmitting said data file using a Bulk Only Transport (BOT) protocol; and a flash memory controller mounted on the card body and electrically connected to said flash memory device and said input/output interface circuit, wherein the flash memory controller comprises:

(a) means for determining whether the flash memory device is supported by a processing unit of the flash memory controller in accordance with a flash detection algorithm code, (b) arbitration means for identifying non-functional memory cells of the flash memory device, and for assigning physical addresses to an associated logical address, where each said physical address corresponds to an associated plurality of memory cells of the flash memory device;

(c) means for operating in one of:

a programming mode in which said flash memory controller activates said input/output interface circuit to receive the data file from the host computer, and to store the data file in a first physical address of said flash memory device that is assigned by said arbitration means to a first logical address, said programming mode being initiated in response to an associated standard USB BOT write command issued from the host computer to the flash memory controller;

a data retrieving mode in which said flash memory controller receives a standard USB BOT read command issued from host computer including the first logical address, and activates said input/output interface circuit to transmit the data file read from the first physical address to the host computer; and a data resetting mode in which obsolete data previously written into one or more memory blocks is erased from the flash memory device, wherein said data resetting mode is initiated and performed automatically by said flash memory controller.

2. The electronic data flash card according to claim 1, wherein the one or more flash memory devices include a first flash memory device and a second flash memory device.

3. The electronic data flash card according to claim 2, wherein the first flash memory device includes a first plurality of memory cells and the second flash memory device includes a second plurality of memory cells, and wherein the first plurality is greater than or equal to the second plurality.

4. The electronic data flash card according to claim 2, wherein said arbitration means includes means for performing at least one of a programming operation, a data retrieving operation, and a data resetting operation in the first flash memory device while simultaneously performing at least one of a programming operation, a data retrieving operation, and a data resetting operation in the second flash memory device.

5. The electronic data flash card according to claim 1, wherein said arbitration means includes means for searching the flash memory device for functional memory cells, and for reassigning the first logical address associated with one or more non-functional memory cells to a second physical address associated with the functional memory cells.

6. The electronic data flash card according to claim 1, wherein said flash memory device includes an internal buffer, and wherein the flash memory controller includes means for temporarily storing said data file in said internal buffer prior to storing said data in the memory cells associated with said first physical address.

7. The electronic data flash card according to claim 1, wherein said arbitration means further comprises means for identifying non-functional memory cells previously assigned to said first logical address, for identifying functional, unassigned memory associated with a second physical address, and for reassigning said first logical address to the second physical address.

8. The electronic data flash card according to claim 1, wherein said arbitration means further comprises means for identifying an updated data file assigned to the first logical address, for reassigning the first logical address to a second physical address, and for storing the updated data file in the memory cells associated with the second physical address.

9. The electronic data flash card according to claim 8, wherein said arbitration means further comprises means for erasing obsolete data from the memory cells associated with said first physical address after storing the updated data file in the memory cells associated with the second physical address, and for reassigning the first physical address to a second logical address.

10. The electronic data flash card according to claim 1, wherein said arbitration means further comprises means for comparing a first erase count associated with the memory cells of the first physical address with a second erase count associated with the memory cells of a second physical address, and transferring the data file from the memory cells of the first physical address to the memory cells of a second physical address when the first erase count is greater than the second erase count.

11. The electronic data flash card according to claim 10, wherein said flash memory device includes an internal buffer, and wherein the flash memory controller includes means for temporarily storing said data file in said internal buffer prior to storing said data in the memory cells associated with said second physical address.

12. The electronic data flash card according to claim 2, wherein the flash memory controller includes means for supporting at least one of dual-channel parallel access and interleave access to the first flash memory device and the second flash memory device.

* * * * *